A. B. HAYS.
LEVER HARROW.
APPLICATION FILED SEPT. 23, 1910.

Patented May 14, 1912.

A. B. HAYS.
LEVER HARROW.
APPLICATION FILED SEPT. 23, 1910.

1,026,394.

Patented May 14, 1912.
3 SHEETS—SHEET 2.

Witnesses
Jos Gregory
M. J. Miller

Inventor
A. B. Hays
By
Attorneys

A. B. HAYS.
LEVER HARROW.
APPLICATION FILED SEPT. 23, 1910.
1,026,394.
Patented May 14, 1912.
3 SHEETS—SHEET 3.
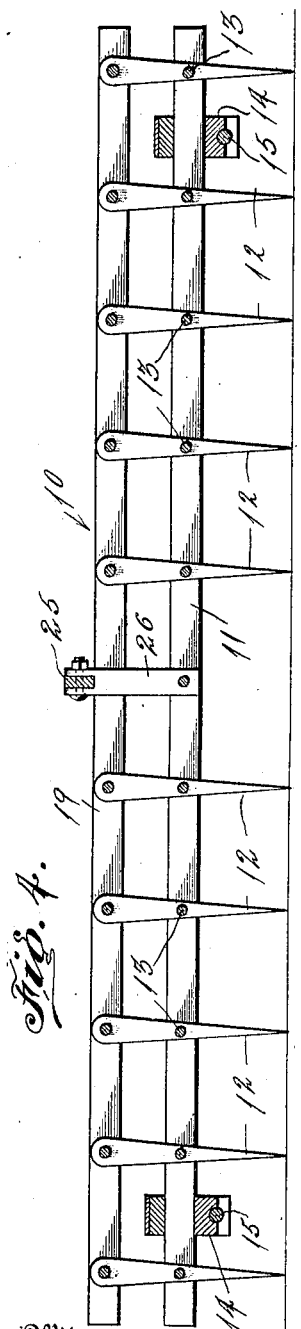
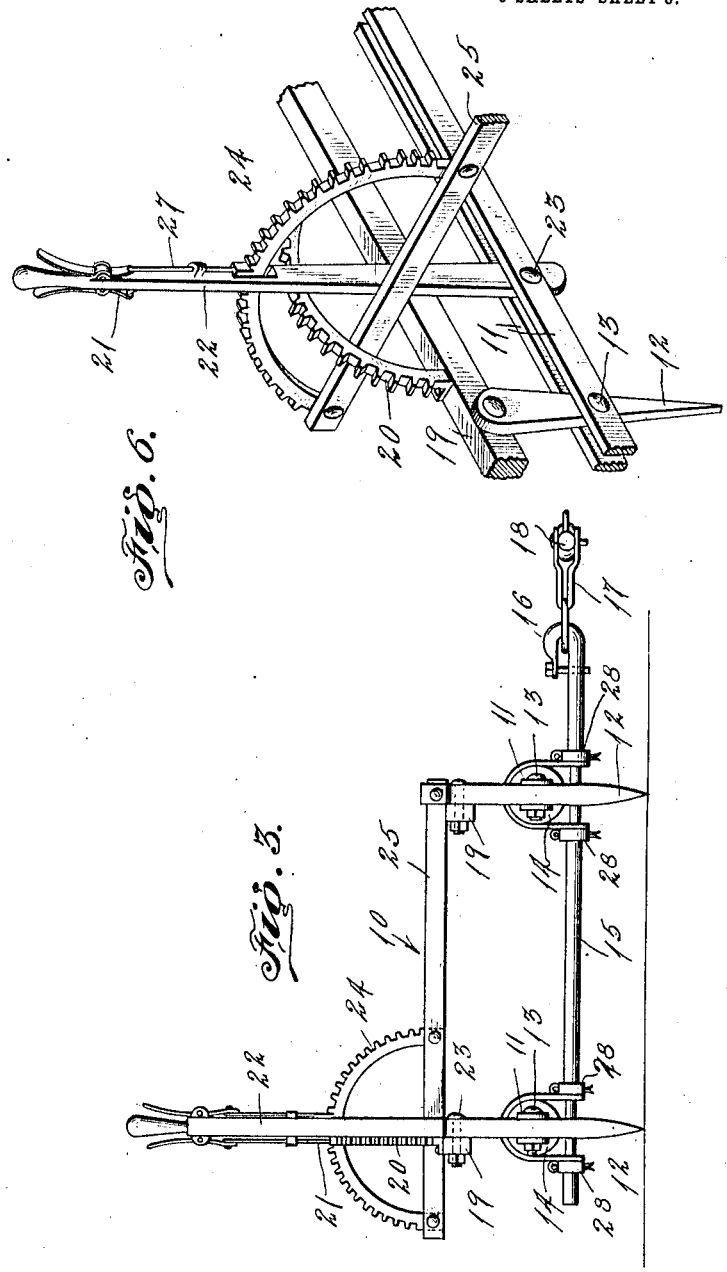

UNITED STATES PATENT OFFICE.

ATHOL B. HAYS, OF WOLF BUTTE, NORTH DAKOTA, ASSIGNOR OF ONE-HALF TO FRANK A. HAYS, OF WOLF BUTTE, NORTH DAKOTA.

LEVER-HARROW.

1,026,394.     Specification of Letters Patent.     Patented May 14, 1912.

Application filed September 23, 1910. Serial No. 583,476.

*To all whom it may concern:*

Be it known that I, ATHOL B. HAYS, a citizen of the United States, residing at Wolf Butte, in the county of Adams, State of North Dakota, have invented certain new and useful Improvements in Lever-Harrows; and I do hereby declare the following to be a full, clear, and exact description of the invention, such as will enable others skilled in the art to which it appertains to make and use the same.

The invention relates to harrows and more particularly to the class of adjustable harrows or drags.

The primary object of the invention is the provision of a harrow in which the harrow teeth may be adjusted laterally or in a direction with the line of draft of the harrow.

Another object of the invention is the provision of a harrow in which the teeth thereof are pivotally mounted in rows so that each row of teeth may be adjusted whereby the teeth in the row will assume an angular disposition relative to the ground, and which teeth may be held in their adjusted position.

A still further object of the invention is to simplify and generally improve the structure of this class of implements whereby they will be more effectual in operation and also to enable the same to be manufactured at a minimum expense.

With these and other objects in view the invention consists in the construction, combination and arrangement of parts as will be hereinafter more fully described illustrated in the accompanying drawings disclosing the preferred form of embodiment of the invention and pointed out in the claims hereunto appended.

Figure 1:
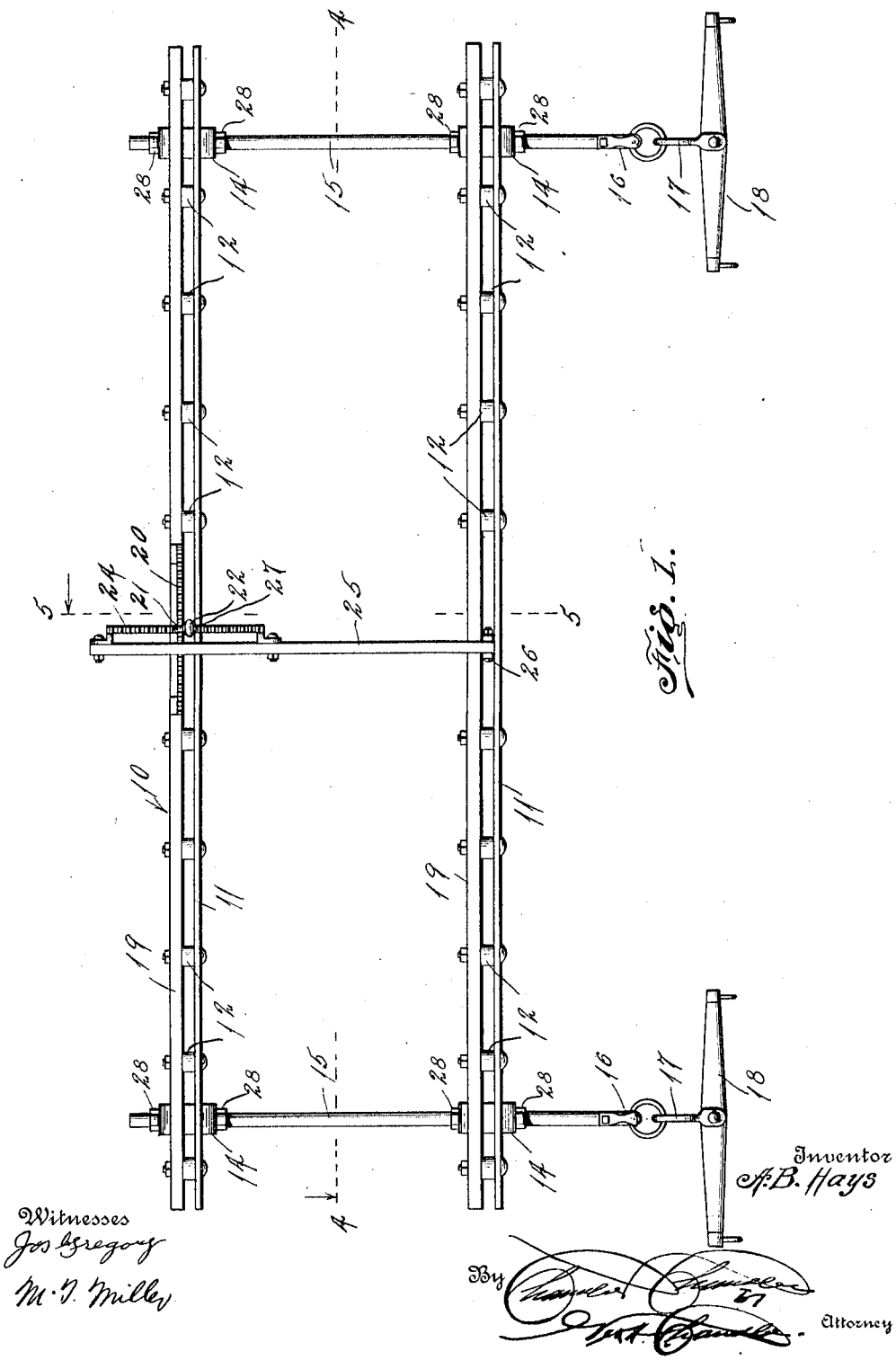
Figure 2:
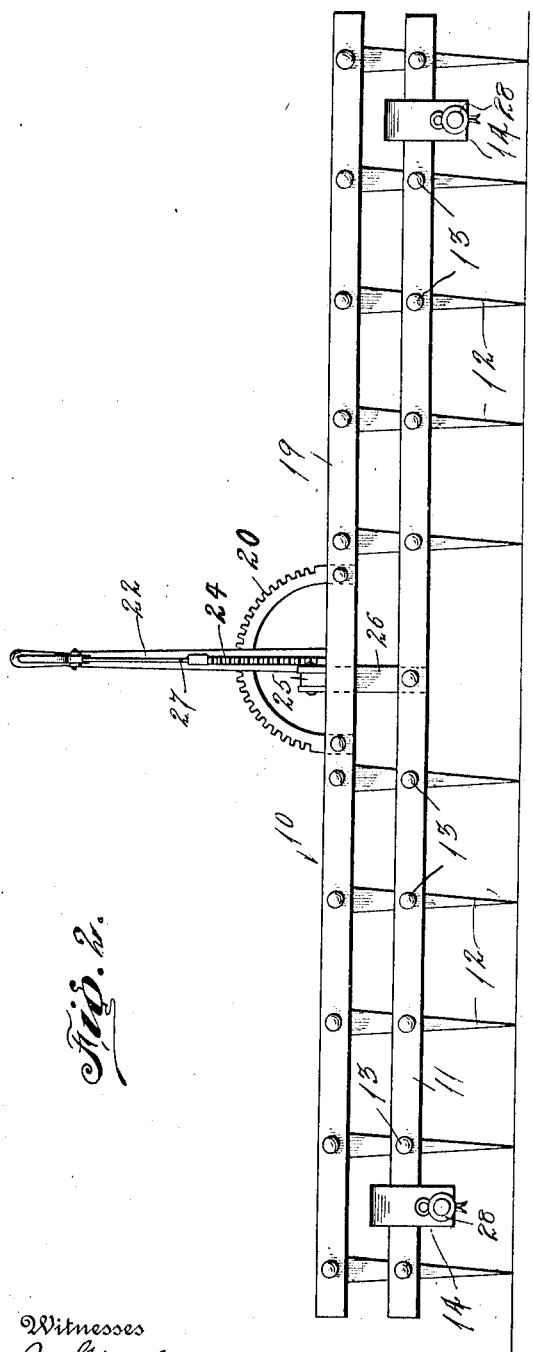
Figure 5:
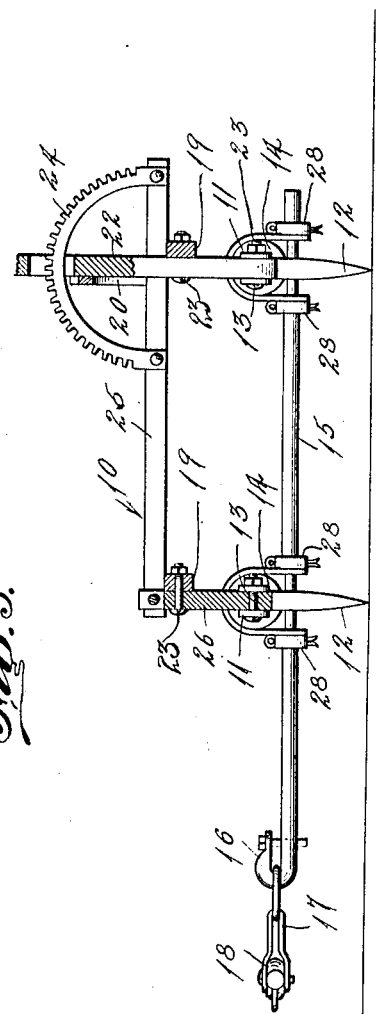

In the drawings: Figure 1 is a top plan view of a harrow constructed in accordance with the invention. Fig. 2 is a side elevation thereof. Fig. 3 is an end elevation. Fig. 4 is a sectional view on the line 4—4 of Fig. 1. Fig. 5 is a sectional view on the line 5—5 of Fig. 1. Fig. 6 is a detail enlarged view in perspective elevation of the operating lever and its manner of connection with the adjunct parts of the harrow.

Similar reference characters indicate corresponding parts throughout the several views in the drawings.

Referring to the drawings by numerals 10 designates generally a harrow comprising a plurality of spaced horizontally disposed teeth carrying bars each comprising spaced strips 11 between which are arranged a set of harrow teeth 12, each being connected to the said strips 11 by a medial pivot 13, the same being passed through the said strips 11, whereby they will be held against separation from each other. Surrounding these horizontal bars are split bearings 14 the latter being detachably secured to spaced forwardly directed bars 15 which carry at their forward ends hook members 16, the same being detachably engaged by clevises 17 connected to a drag beam 18 which has connected thereto in the ordinary manner draft animals whereby the harrow may be drawn through a field.

Pivotally connected to the upper ends of the teeth 12 are adjusting bars 19 to one of which is fixed a toothed segment 20 the same being normally engaged by a manually releasable spring controlled locking pawl or dog 21 carried upon a throw lever 22, the same being pivoted as at 23 to both the adjusting bar 19 carrying the segment and the tooth carrying bar directly beneath the same so that upon shifting the said throw lever 22 laterally to the line of draft of the harrow the said teeth 12 will be angularly adjusted laterally of the implement. Disposed at right angles to the segment 20 is a further toothed segment 24 the same being freely slidable in a suitable slot formed in the throw lever 22 and this segment 24 is fixed to the end of an adjusting link 25 the same being disposed parallel with the line of draft of the harrow and pivotally connected in the upper bifurcated end of a swinging post 26 the same being pivoted to the other adjusting bar 19 and also between the strips 11 of the remaining tooth carrying bar of the harrow. Connected to the throw lever 22 is a further manually releasable spring controlled locking pawl 27 the latter being normally engaged with the toothed segment 24 so that on release of the said pawl 27 from the segment 24 the throw lever may be swung in a direction to shift the adjusting link 25 in a direction with the line of draft of the harrow thus causing the turning of the teeth carrying bars whereby the teeth will be angularly adjusted in the direction of the line of draft of the harrow.

At opposite sides of the bearings 14 and surrounding the teeth carrying bars are screw set collars 28 which prevent displacement of the said bars within the bearing 14 laterally of the line of draft of the harrow.

From the foregoing it is thought that the construction and operation of the invention will be clearly understood and therefore a more extended explanation has been omitted.

What is claimed is:—

1. In a harrow, a plurality of rotatable bars, a plurality of teeth pivotally connected to said bars, and a lever capable of movement in a plurality of directions for laterally adjusting said teeth relative to the line of draft of the harrow and for rotating said bars.

2. In a harrow, spaced parallel bars, bearings supported by said bars, rotatable bars journaled in said bearings transversely of the first named bars, a series of harrow teeth pivotally supported by the last named bars, adjustable bars arranged at right angles to each other and connected with the said teeth and rotatable bars respectively, and a lever capable of movement in a plurality of directions for independently adjusting said adjusting bars.

3. In a harrow, spaced parallel bars, bearings carried by said bars, a pair of tooth supporting bars rotatably mounted in the bearings transversely of the parallel bars, a series of harrow teeth pivoted to each of the transverse bars, a second pair of transverse bars disposed above the first named transverse bars respectively and to which the upper ends of the corresponding harrow teeth are pivoted, a link pivoted to the upper bars, a notch segment carried by the link, a lever pivoted to one of the rotatable bars in proximity to the segment and to an upper transverse bar, a latch carried by the lever in coöperative relation to the notch segment, a second notch segment carried by the link and disposed in proximity to the lever and a second latch carried by the lever in coöperative relation to the second notch segment.

In testimony whereof, I affix my signature, in presence of two witnesses.

ATHOL B. HAYS.

Witnesses:
O. H. ERICKSON,
T. J. MORTON.

---

Copies of this patent may be obtained for five cents each, by addressing the "Commissioner of Patents, Washington, D. C."